(12) United States Patent
Ikai et al.

(10) Patent No.: US 9,355,658 B2
(45) Date of Patent: May 31, 2016

(54) MAGNETIC HEAD AND MAGNETIC DISK DEVICE

(71) Applicant: Kabushiki Kaisha Toshiba, Minato-ku, Tokyo (JP)

(72) Inventors: Toshiyuki Ikai, Yokohama Kanagawa (JP); Tomoko Taguchi, Tokyo (JP); Kenichiro Aoki, Tokyo (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 0 days.

(21) Appl. No.: 14/625,338

(22) Filed: Feb. 18, 2015

(65) Prior Publication Data

US 2016/0064020 A1 Mar. 3, 2016

(30) Foreign Application Priority Data

Sep. 3, 2014 (JP) ................... 2014-179487

(51) Int. Cl.
*G11B 5/31* (2006.01)
*G11B 5/255* (2006.01)
*G11B 5/127* (2006.01)
*G11B 5/012* (2006.01)
*G11B 5/00* (2006.01)

(52) U.S. Cl.
CPC .............. *G11B 5/3136* (2013.01); *G11B 5/012* (2013.01); *G11B 5/1278* (2013.01); *G11B 5/255* (2013.01); *G11B 5/314* (2013.01); *G11B 5/483* (2015.09); *G11B 2005/0021* (2013.01)

(58) Field of Classification Search
CPC ...... G11B 5/012; G11B 5/3136; G11B 5/314; G11B 5/4866; G11B 2005/0021; G11B 5/6088; G11B 7/1387; G11B 11/10554; G11B 11/1058; G11B 5/3133; G11B 13/08; G11B 5/6011; G11B 5/1278; G11B 5/483; G11B 5/255; G11B 5/02
USPC ..................... 369/13.13, 13.33, 13.32, 13.01; 360/204.1, 59, 39, 125
See application file for complete search history.

(56) References Cited

U.S. PATENT DOCUMENTS

| 7,027,248 | B2 * | 4/2006 | Hamaguchi | G11B 5/012 360/294.1 |
| 7,911,882 | B2 * | 3/2011 | Shimazawa | G11B 5/3136 360/59 |
| 8,218,405 | B2 | 7/2012 | Kurita et al. | |
| 8,462,594 | B1 * | 6/2013 | Aoki | G11B 5/314 369/13.13 |
| 8,817,581 | B1 * | 8/2014 | Tsutsumi | G11B 5/314 360/39 |
| 2004/0027709 | A1 | 2/2004 | Hamaguchi et al. | |
| 2007/0139818 | A1 | 6/2007 | Shimazawa et al. | |
| 2013/0229895 | A1 * | 9/2013 | Shiroishi | G11B 5/1278 369/13.14 |

FOREIGN PATENT DOCUMENTS

JP 2009-259359 A 11/2009
JP 2011-165276 A 8/2011

* cited by examiner

*Primary Examiner* — Ali Neyzari
(74) *Attorney, Agent, or Firm* — White & Case LLP

(57) ABSTRACT

According to one embodiment, a magnetic head is arranged opposite a magnetic recording medium including a recording layer. The magnetic head includes a magnetic pole, a light emitting unit, and a distance adjusting unit. The magnetic pole includes a soft magnetic material. The light emitting unit is arranged with respect to the magnetic pole in a travel direction of the magnetic head, and emits light with respect to the recording layer. The distance adjusting unit adjusts a distance between the magnetic pole and the light emitting unit.

18 Claims, 8 Drawing Sheets

MAGNETIC HEAD AND MAGNETIC DISK DEVICE

CROSS-REFERENCE TO RELATED APPLICATIONS

This application is based upon and claims the benefit of priority from Japanese Patent Application No. 2014-179487, filed on Sep. 3, 2014; the entire contents of which are incorporated herein by reference.

FIELD

Embodiments described herein relate generally to a magnetic head and a magnetic disk device.

BACKGROUND

Conventionally, there has been known a magnetic disk device provided with a magnetic head that performs thermally assisted magnetic recording by using near-field light with respect to a magnetic disk having high coercivity. In such a device, the magnetic head includes: a near-field light generating element that generates near-field light; and a magnetic pole for writing data to a magnetic disk. Upon writing data to the magnetic disk, such a device temporarily and locally heats up the magnetic disk by the near-field light generated by the near-field light generating element. Then, the device writes data with respect to a region of the magnetic disk at which coercivity is decreased by the heating. Consequently, the recording density of the magnetic disk is increased.

Recently, for such a magnetic disk device, it is desired to further improve writing quality with respect to the magnetic disk.

DETAILED DESCRIPTION

In general, according to one embodiment, a magnetic head is arranged opposite a magnetic recording medium comprising a recording layer. The magnetic head comprises a magnetic pole, a light emitting unit, and a distance adjusting unit. The magnetic pole comprises a soft magnetic material. The light emitting unit is arranged with respect to the magnetic pole in a travel direction of the magnetic head, and emits light with respect to the recording layer. The distance adjusting unit adjusts a distance between the magnetic pole and the light emitting unit.

Exemplary embodiments of a magnetic head and a magnetic disk device will be explained below in detail with reference to the accompanying drawings. The present invention is not limited to the following embodiments.

First Embodiment

Figure 1:
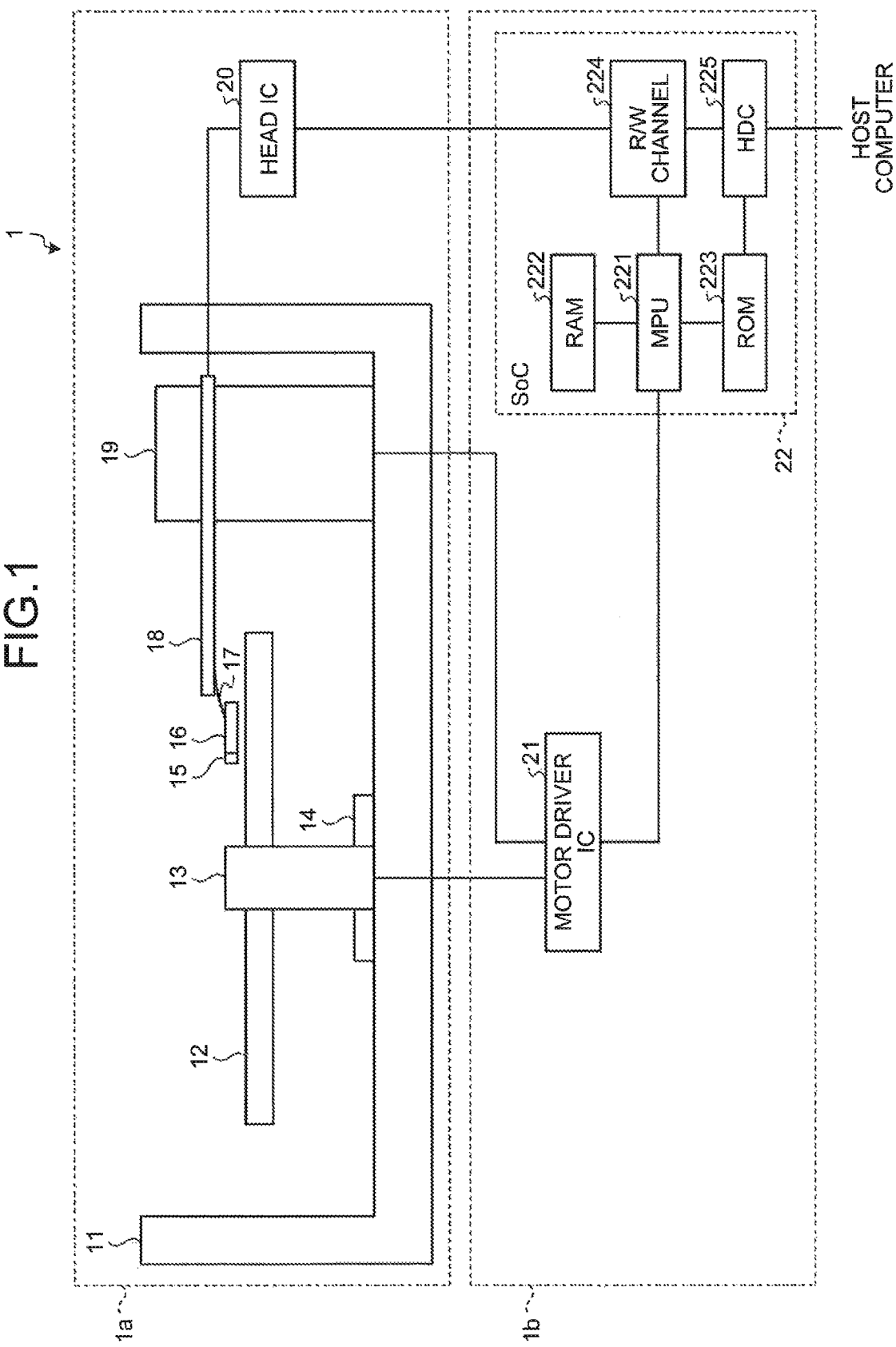
FIG. 1 is a block diagram illustrating a hardware configuration of a magnetic disk device according to a first embodiment.

A first embodiment is described with reference to FIGS. 1 to 8. FIG. 1 is a diagram illustrating a hardware configuration of a magnetic disk device 1 of the present embodiment. The magnetic disk device 1 comprises a disk enclosure 1a and a circuit board 1b.

The disk enclosure 1a comprises a housing 11, a magnetic disk 12, a spindle 13, a spindle motor (SPM) 14, a magnetic head 15, a slider 16, a suspension 17, an arm actuator 18, a voice coil motor (VCM) 19, and a head integrated chip (IC) 20. The circuit board 1b comprises a motor driver IC 21 and a system-on-a-chip (SoC) 22. In order to simplify explanations, the head IC 20 is arranged outside the housing 11 in FIG. 1. However, the head IC 20 is in fact arranged at a predetermined location of the arm actuator 18.

The magnetic disk 12 is a disk-shaped recording medium that records therein various information. The magnetic disk 12 is configured to be writable by a perpendicular magnetic recording (PMR) scheme. The magnetic disk 12 has a recording layer with magnetic anisotropy along a substantially vertical direction with respect to a medium surface of the magnetic disk 12. A magnetic body of the magnetic recording layer is magnetized in a substantially vertical direction with respect to the surface (medium surface) of the magnetic disk 12 by the magnetic field applied by the later-described magnetic head 15. Further, for the magnetic recording layer of the magnetic disk 12, a material having high coercivity at room temperature is used.

The magnetic disk 12 is rotatably fixed to the housing 11 via the spindle 13. The SPM 14 indirectly rotates the magnetic disk 12 by applying torque on the spindle 13.

As is described in details later, the magnetic head 15 is configured to read and write signals and data with respect to the magnetic disk 12. The magnetic head 15 is provided at an end of the slider 16 in an elongated direction of the slider 16. Here, the slider 16 floats over the magnetic disk 12 by receiving an air flow generated by the rotation of the magnetic disk 12. The slider 16 is connected to the arm actuator 18 via the suspension 17 which allows the floating of the magnetic head 15. The arm actuator 18 swings in a direction along a recording surface of the magnetic disk 12 by the VCM 19. Consequently, the magnetic head 15 can read and write signals and data with respect to any location on the magnetic disk 12.

The head IC 20 is electrically connected to the magnetic head 15 and the SoC 22. The head IC 20 amplifies the signals and data read out from the magnetic disk 12 by the magnetic head 15, and outputs the read out signals and data to the SoC 22 described later. Further, the head IC 20 amplifies the signals and data output from the SoC 22, and outputs the amplified signals and data to the magnetic head 15. Still further, the head IC 20 outputs a test voltage and a piezo voltage described later to the magnetic head 15.

The motor driver IC 21 is connected to the SPM 14, the VCM 19, and the SoC 22. The motor driver IC 21 controls the SPM 14 and the VCM 19 in accordance with a control signal from the SoC 22 to control a positioning of the magnetic head 15 with respect to the magnetic disk 12.

The SoC 22 comprises a micro processing unit (MPU) 221, a random access memory (RAM) 222, a read only memory (ROM) 223, a read and write (R/W) channel 224, and a hard disk controller (HDC) 225.

The MPU 221 is connected to the motor driver IC 21, the RAM 222, the ROM 223, and the R/W channel 224. The MPU 221 controls operations of various units and portions of the magnetic disk device 1. In particular, the MPU 221 sequentially reads and executes a firmware and various applications stored in the ROM 223 to control operations of each portion and unit of the magnetic disk device 1. The ROM 223 stores therein the firmware, various applications, and various data required to execute the firmware and various applications. The RAM 222 provides a work area for when the MPU 221 executes the firmware and/or the applications, as a main memory of the magnetic disk device 1.

The R/W channel 224 is connected to the MPU 221, the HDC 225, and the head IC 20. The R/W channel 224 performs a predetermined signal processing on data output from the HDC 225, and outputs it to the head IC 20. Further, the R/W channel 224 outputs a test signal generated by the MPU 221 to the head IC 20. Further, the R/W channel 224 generates a write gate signal and outputs it to the head IC 20. Further, the R/W channel 224 instructs the head IC 20 to output the test voltage and the piezo voltage described later. Further, the R/W channel 224 performs a predetermined signal processing on signals and data output from the head IC 20, and outputs them to the HDC 225 and/or the MPU 221.

The HDC 225 is connected to the ROM 223, the R/W channel 224, and a host computer not illustrated. The HDC 225 constitutes an interface for the host computer. The HDC 225 outputs data received from the host computer to the R/W channel 224, and outputs data received from the R/W channel 224 to the host computer.

Figure 2:
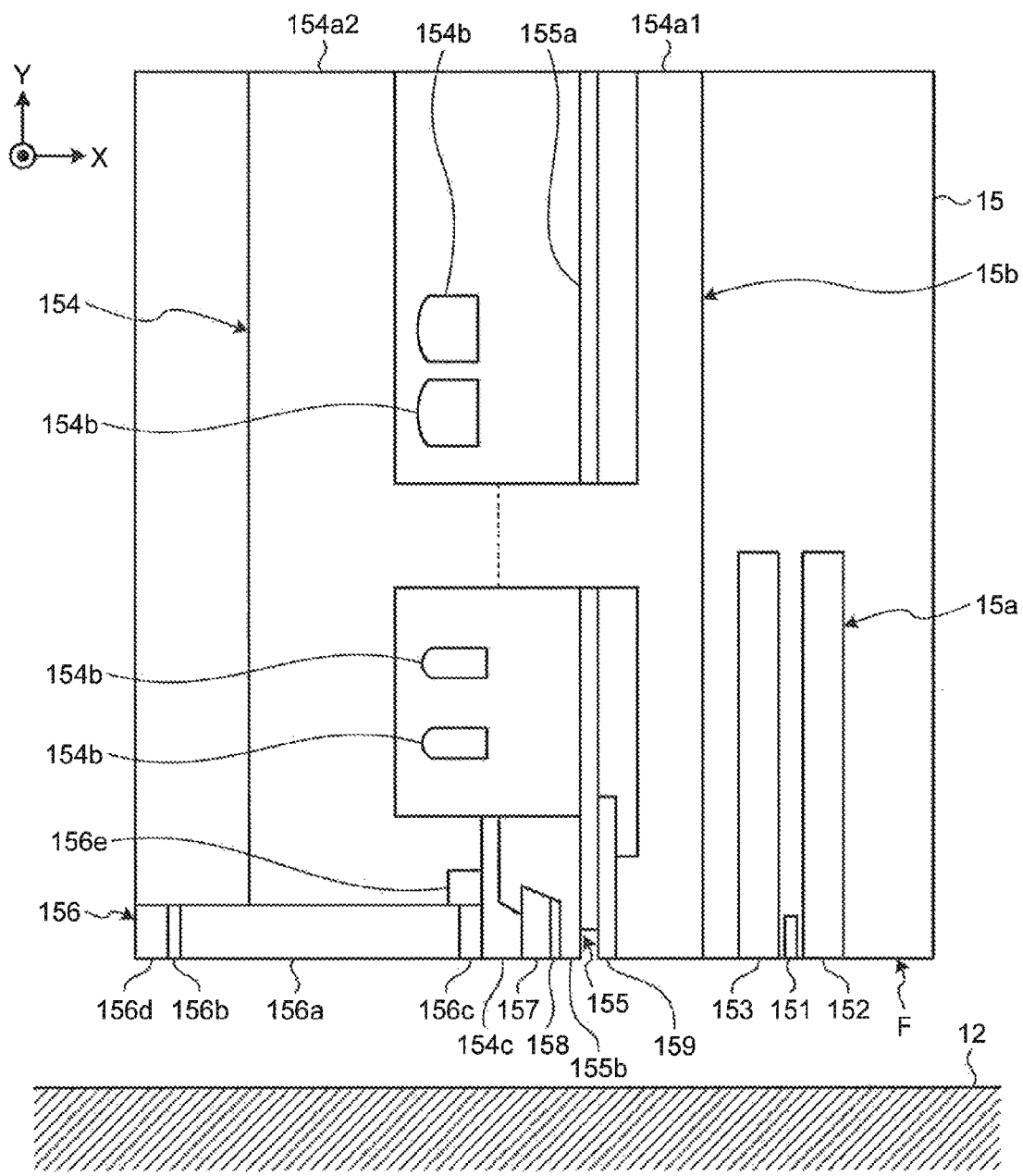
FIG. 2 is a cross sectional view of a magnetic head according to the first embodiment.
Figure 3:
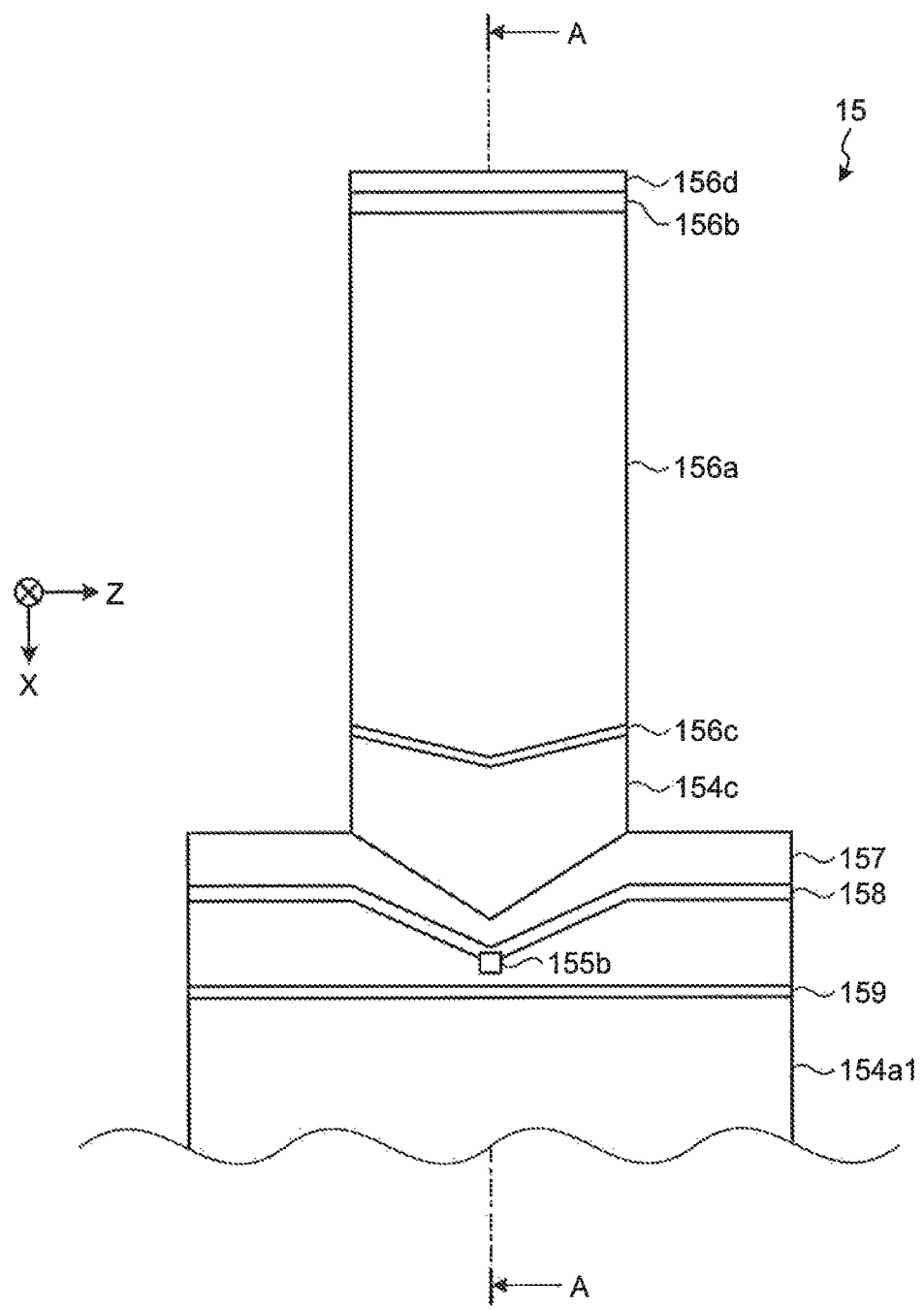
FIG. 3 is a view looking at a portion of the magnetic head from a floating surface side of the magnetic head, according to the first embodiment.

Next, a configuration of the magnetic head 15 is described based on FIGS. 2 and 3. FIG. 2 is a cross sectional view of the magnetic head 15 on an XY plane. FIG. 3 is a plan view of a portion of a face of the magnetic head 15 opposing the magnetic disk 12, looking up the portion from the magnetic disk 12 side. Herein, a head travel direction means a direction toward which the magnetic head 15 moves relative to the magnetic disk 12 due to the rotation of the magnetic disk 12, and is equivalent to +X direction in FIGS. 2 and 3. The X-axis, the Y-axis, and the Z-axis in FIG. 2 are orthogonal to each other. The X-axis, the Y-axis, and the Z-axis in FIG. 3 are orthogonal to each other. The X-axis, the Y-axis, and the Z-axis of FIG. 2 correspond to the X-axis, the Y-axis, and the Z-axis of FIG. 3, respectively. Further, in the following explanations, a face of the magnetic head 15 opposing the magnetic disk 12 is referred to as a floating surface F of the magnetic head 15. Further, although not illustrated, the floating surface F of the magnetic head is covered entirely by a protective coating such as, e.g., an acrylonitrile butadiene styrene (ABS) resin.

First, a configuration of the magnetic head 15 is described with reference to FIG. 2. Here, FIG. 2 is also a cross sectional view of the magnetic head 15 taken along a line A-A illustrated in FIG. 3. As illustrated in FIG. 2, the magnetic head 15 roughly comprises: a reproduction unit 15a configured to be capable of reading signals and/or data written on the magnetic disk 12; and a recording unit 15b capable of writing signals and/or data to the magnetic disk 12.

The reproduction unit 15a comprises a reproduction element 151 and two shields 152, 153. The reproduction element 151 is arranged between the shields 152, 153 in the X-axis direction. At least a portion of the reproduction element 151 is exposed to the floating surface F via the protective coating not illustrated. The reproduction element 151 is a tunnel magneto-resistance (TMR) element, and reads out the signals and/or data written on the magnetic disk 12 via a sense current. The shields 152, 153 function as magnetic shields as well as electrodes that supplies the sense current of the reproduction element 151. A wiring not illustrated is connected to each of the shields 152, 153. A voltage for supplying the sense current to the reproduction element 151 is applied to the each of the shields 152, 153 from the head IC 20. In the present embodiment, the example is explained in which the TMR element is used as the reproduction element 151. However, the present embodiment is not limited thereto, and any configuration such as a giant magneto-resistance (GMR) element can be employed as the reproduction element 151 as long as the configuration can read out data written on the magnetic disk 12.

The recording unit 15b comprises a magnetic core unit 154, a light generating unit 155, a piezo element unit 156, a magnetic pole position control unit 157, a heat dissipating unit 158, and a rigid member 159.

The magnetic core unit 154 comprises a magnetic yoke 154a, a coil 154b, and a magnetic pole 154c.

The magnetic yoke 154a is integrally formed by a leading yoke 154a1 and a trailing yoke 154a2. Each of the leading yoke 154a1 and the trailing yoke 154a2 is formed of a high saturation density material. The leading yoke 154a1 has a substantially inverse F-shape in the cross section of the magnetic head 15 as illustrated in FIG. 2. The trailing yoke 154a2 has a shape obtained by rotating the substantially inverse F-shape of the leading yoke 154a1 by 180 degrees around the Y-axis, in the cross section of the magnetic head 15 illustrated in FIG. 2. The leading yoke 154a1 and the trailing yoke 154a2 are arranged to oppose each other, and are connected to each other at a middle part (a part near a winding center of the coil 154b) in the Y-axis direction. A distal end of the leading yoke 154a1 located on the floating surface F side is exposed to the floating surface F via the protective coating. A distal end of the trailing yoke 154a2 located on the floating surface F side is covered by the piezo element unit 156 described later. Here, the leading yoke 154a1 and the trailing yoke 154a2 of the present embodiment can be made of the same material, or can be formed by different material.

The coil 154b is would around a center of the trailing yoke 154a2 in the Y-axis direction. The coil 154b is connected to the head IC 20 via a wiring not illustrated, and generates a magnetic field from the magnetic yoke 154a by the current output from the head IC 20. The magnetic field generated by the coil 154b is applied from the magnetic pole 154c to the magnetic disk 12 in a substantially vertical direction with respect to the magnetic recording surface.

The magnetic pole 154c is arranged on the distal end of the trailing yoke 154a2 at the floating surface F side. Further, the magnetic pole 154c is arranged adjacent to the trailing yoke 154a2 in front of the distal end of the trailing yoke 154a2 in the head travel direction. The magnetic pole 154c is exposed on the floating surface F via the protective coating. The magnetic pole 154c is formed by high Bs material, unlike the trailing yoke 154a2.

The light generating unit 155 comprises a light guide 155a and a light emitting unit 155b.

The light guide 155a is arranged between the light emitting unit 155b and the rigid member 159 in the X-axis direction at near the floating surface F. Further, the light guide 155a is extended in +Y direction of FIG. 2 from near the floating surface F, and connected to a light source. The light guide 155a guides light (e.g., laser light) supplied by the light source to the light emitting unit 155b. An end of the light guide 155a at the floating surface side is separated from the floating surface F in the +Y direction.

At near the floating surface F, the light emitting unit 155b is arranged in front of the magnetic pole 154c in the head travel direction. In particular, the light emitting unit 155b is arranged between the heat dissipating unit 158 described later and the light guide 155a in the X-axis direction. The light emitting unit 155b has an opening of a length equal to or less than a wavelength of the light supplied by the light source, and forms the near-field light around the opening by the light guided through the light guide 155a. Then, the light emitting unit 155b locally emits the formed near-field light with respect to the magnetic disk 12. That is to say, the light emitting unit 155b generates the near-field light. Consequently, writing of the signals and/or data by the magnetic field generated by the magnetic pole 154c with respect to a position of the magnetic disk 12 at which the near-field light is irradiated locally is assisted. Here, the light guide 155a is arranged so as to be separated from the floating surface F in a direction separating from the magnetic disk 12 (in other word, so as to recess with respect to the floating surface F).

The piezo element unit 156 comprises a piezo element 156a, two piezo electrodes 156b, 156c, and two piezo terminals 156d, 156e.

The two piezo electrodes 156b, 156c are arranged on ends of the piezo element 156a in the X-axis direction, respectively. The two piezo electrodes 156b, 156c function as electrodes for applying voltage on the piezo element 156a.

The two piezo terminals 156d, 156e are connected to the piezo electrodes 156b, 156c, respectively, and also connected to the head IC 20 through wirings not illustrated.

The piezo element 156a is arranged on the floating surface F so that the elongated direction thereof coincides with the X-axis direction. Further, the piezo element 156a is arranged behind the magnetic pole 154c in the head travel direction. In the present embodiment, the piezo element 156a is a piezoelectric element. The piezo element 156a extends/expands in an elongated direction thereof by being applied the voltage via the piezo electrodes 156b, 156c, in accordance with an instruction from the head IC 20. As a result, the piezo element 156a pushes the magnetic pole 154c toward the head travel direction. That is to say, the piezo element 156a can move the magnetic pole 154c in the +X direction. In other word, the piezo element unit 156 adjusts a distance between the magnetic pole 154c and the light emitting unit 155b in the head travel direction.

The magnetic pole position control unit 157 is arranged between the magnetic pole 154c and the heat dissipating unit 158 in the X-axis direction, at nearby the floating surface F. The magnetic pole position control unit 157 is formed of, for example, $SiO_2$ or $LiAlSiO_4$, and has a negative thermal expansion coefficient. In the present embodiment, it is explained a case in which the magnetic pole position control unit 157 contracts due to generated heat around the magnetic pole 154c when the data is written to the magnetic disk 12. However, the present embodiment is not limited thereto.

The heat dissipating unit 158 is arranged between the magnetic pole position control unit 157 and the light emitting unit 155b in the X-axis direction, at nearby the floating surface F. The heat dissipating unit 158 is formed of a body with high thermal conductivity such as, for example, gold (Au) or copper (Cu). The heat dissipating unit 158 dissipates, for example, excess heat due to the near-field light generated by the light emitting unit 155b.

The rigid member 159 is arranged in front of the light emitting unit 155b in the head travel direction, at nearby the floating surface F. Further, the rigid member 159 is extended in the +Y direction in FIG. 2 from near the floating surface F. The rigid member 159 is formed of, for example, a low thermal expansion material. When the position of the magnetic pole 154c is changed in the head travel direction due to the elongation/expansion of the piezo element 156a, the rigid member 159 prevents the position of the light emitting unit 155b to be pushed and changed in the head travel direction.

Next, there are explained arrangements of major configurations of the magnetic head on the floating surface F. As illustrated in FIG. 3, the magnetic head 15 comprises, on the floating surface F and in the direction from the back to the front of the magnetic head 15 in the head travel direction, the piezo terminal 156d, the piezo electrode 156b, the piezo element 156a, the piezo electrode 156c, the magnetic pole 154c, the magnetic pole position control unit 157, the heat dissipating unit 158, the light emitting unit 155b, the rigid member 159, and the leading yoke 154a1, in this order. Although the light guide 155a is arranged between the light emitting unit 155b and the rigid member 159, it is not apparent on the floating surface F because the light guide 155a is recessed from the floating surface F.

According to a magnetic disk device in which a magnetic head for performing a thermally assisted magnetic recording by using near-field light is installed, a near-field light generating element and a magnetic pole are arranged by taking into account the timing of heating by the near-field light and the timing of applying the magnetic field. However, sometimes the magnetic field cannot be applied at a position at which a gradient of a temperature distribution is steep, due to manufacturing error of the magnetic disk device or slight difference in coercivity.

Figure 4:
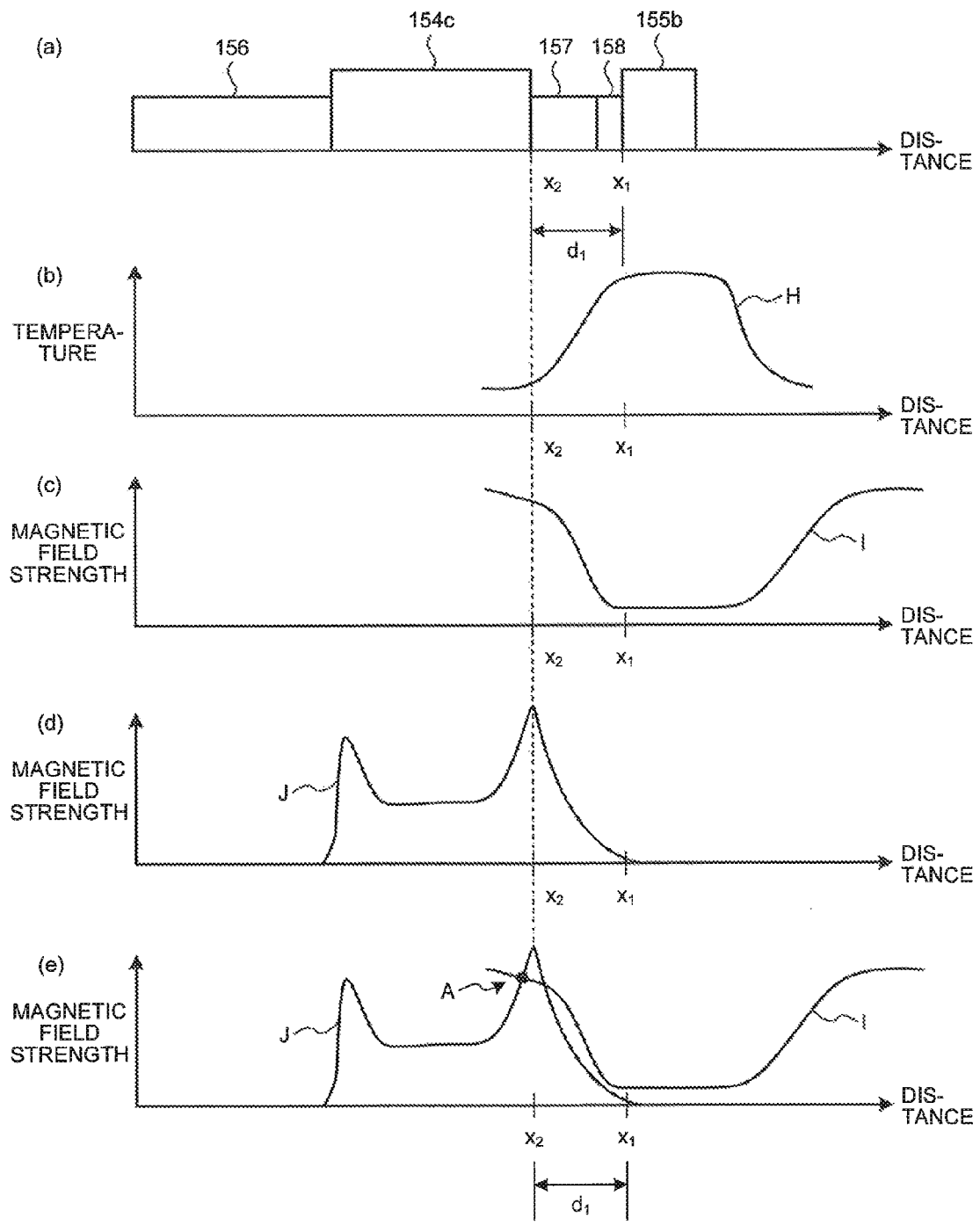
FIG. 4 is a diagram for explaining a position at which a signal is written, before changing a distance between a magnetic pole and a near-field light generating unit, according to the first embodiment.

FIG. 4 is a diagram for explaining an example in which the magnetic pole 154c and the light emitting unit 155b are arranged apart from each other due to the manufacturing error and the like of the magnetic disk device and therefore the magnetic field cannot be applied at a position at which the gradient of the temperature distribution of the surface temperature of the magnetic disk 12 is steep. In this example, as illustrated in (a) of FIG. 4, the position $x_1$ of the light emitting unit 155b is separated from the position $x_2$ of the magnetic pole 154c by a distance $d_1$, in the head travel direction.

(b) of FIG. 4 illustrates the temperature distribution of the surface temperature of the magnetic disk 12 heated by the light emitting unit 155b of (a) of FIG. 4, as a curve H. (c) of FIG. 4 illustrates distribution of magnetic field strength required to magnetize the magnetic disk 12 with a coercivity weaken by the heat, as a curve I. (d) of FIG. 4 illustrates distribution of magnetic field strength generated by the magnetic pole 154c at the time of writing, as a curve J. (e) of FIG. 4 illustrates the curve I and the curve J on the same diagram. Here, positions in the X-axis direction correspond to each other among (a) to (e) of FIG. 4.

As is clear from FIG. 4, the distribution of the magnetic field strength required to invert the magnetization of the magnetic disk heated by the light emitting unit 155b is the curve I in (c) of FIG. 4, and the distribution of the magnetic field strengths formed by the magnetic pole 154c at the time of writing is the curve J in (d) of FIG. 4. Therefore, if the magnetic pole 154c and the light emitting unit 155b have the positional relationship illustrated in (a) of FIG. 4, the magnetic field to be applied at the time of writing is applied at a position A, as illustrated in (e) of FIG. 4. Here, the position A has gradient comparatively gentle as compared to the steepest gradient in the distribution (the curve I) of the magnetic field strength required to invert the magnetization. As a result, quality at the time of writing data, such as the signal-to-noise ratio and/or the bit error data, might be degraded.

Hence, according to the present embodiment, the distance between the magnetic pole 154c and the light emitting unit 155b is adjusted by the piezo element unit 156 at the time of testing and/or the like that is performed after assembling the magnetic disk device but before its shipment. Consequently, it becomes possible to apply the magnetic field at a position where the gradient of the temperature distribution of the surface temperature of the magnetic disk 12 is steep.

Figure 5:
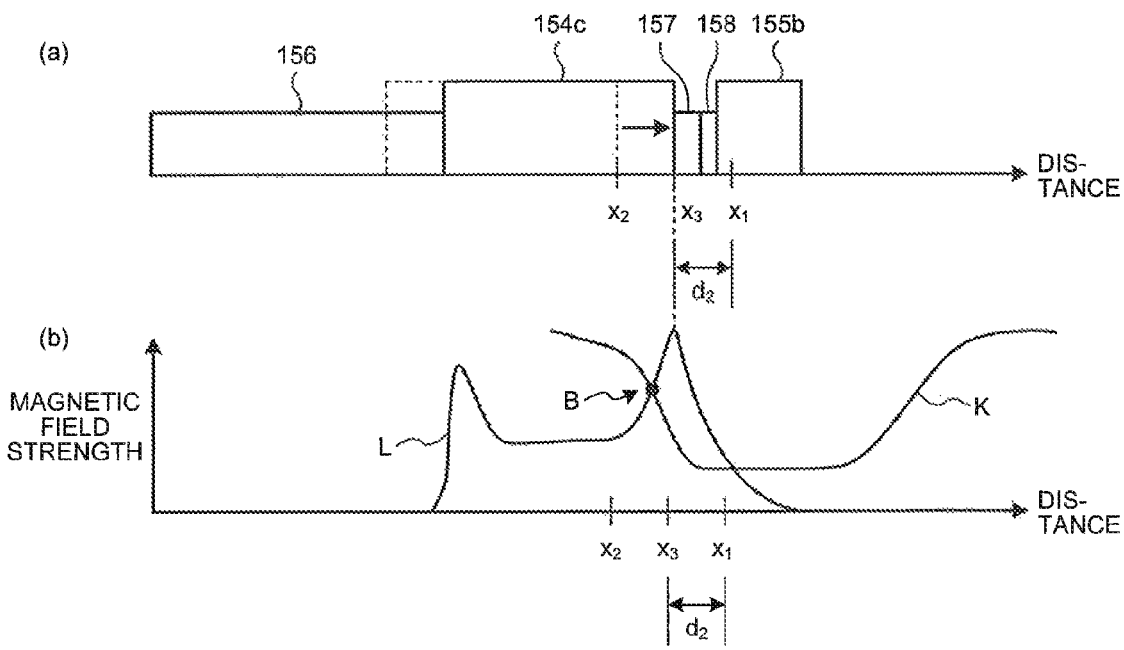
FIG. 5 is a diagram for explaining the position at which the signal is written, after changing the distance between the magnetic pole and the near-field light generating unit, according to the first embodiment.

FIG. 5 is a diagram for explaining an example after the distance between the magnetic pole 154c and the light emitting unit 155b is adjusted by the piezo element unit 156. In this example, as illustrated in (a) of FIG. 5, the magnetic pole 154c corresponding to a distance not yet being adjusted, as illustrated by a dotted line at a position $X_2$, is moved to a position $X_3$ in the head travel direction (the arrow direction in (a) of FIG. 5). Accordingly, the distance between the magnetic pole 154c and the light emitting unit 155b is changed to a distance $d_2$. As a result, as illustrated in (b) of FIG. 5, the magnetic field to be applied at the time of writing can be applied at a position B where the gradient is comparatively steep as compared to the gradient of other positions of the distribution (a curve K) of the magnetic field strengths required to invert the magnetization. Consequently, the quality at the time of writing data, such as the signal-to-noise ratio and/or the bit error rate, can be improved. Here, the curve K in (b) of FIG. 5 is distribution of magnetic field strength required to invert magnetization of the magnetic disk heated by the light emitting unit 155b. Further, the curve L in (b) of FIG. 5 is distribution of magnetic field strength formed by the magnetic pole 154c at the time of writing.

Next, functions realized by the MPU 221 when processing (hereinafter, referred to as piezo voltage setting process) for adjusting the distance between the magnetic pole 154c and the light emitting unit 155b is executed and various units of the ROM 223 referred to at the time of the piezo voltage setting process are explained. The piezo voltage setting process is realized by a program stored in the ROM 223.

Figure 6:
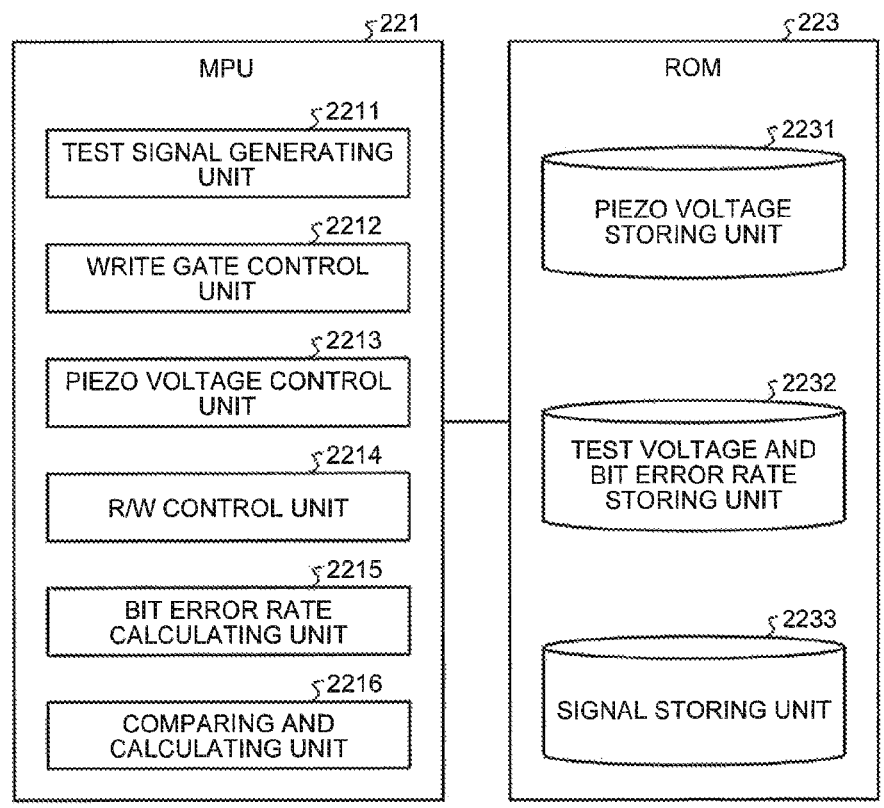
FIG. 6 is a block diagram illustrating functional configurations realized by a micro processing unit (MPU) and interior configurations of a read only memory (ROM), according to the first embodiment.

The MPU 221 executes a program stored in the ROM 223 to realize each function illustrated in FIG. 6 (a test signal generating 2211, a write gate control unit 2212, a piezo voltage control unit 2213, a read and write (R/W) control unit 2214, a bit error rate calculating unit 2215, a comparing and calculating unit 2216). That is to say, the MPU 221 comprises a plurality of functional units illustrated in FIG. 6. The ROM 223 comprises a piezo voltage storing unit 2231, a piezo voltage and bit error rate storing unit 2232, and a signal storage unit 2233. The piezo voltage storing unit 2231 preliminarily stores therein a plurality of candidate voltage values specified at the time of manufacture of the magnetic disk device 1, for example. The piezo voltage storing unit 2231 stores therein a piezo voltage determined by the piezo voltage setting process. The test voltage and bit error rate storing unit 2232 stores therein the test voltage and the bit error rate in association with each other. The signal storing unit 2233 stores therein the test signals read out from the magnetic disk 12.

The test signal generating unit 2211 generates a predetermined test signal that is to be experimentally written to the magnetic disk 12 at the time of determining the piezo voltage. The write gate control unit 2212 controls the output of the write gate signal by the R/W channel 224. The piezo voltage control unit 2213 acquires the candidate voltage values and/or the piezo voltage values from the piezo voltage storing unit 2231, and controls applying a voltage corresponding to the acquired voltage value on the piezo element unit 156. The R/W control unit 2214 controls writing the test signal generated by the test signal generating unit 2211 to the magnetic disk 12. Further, the R/W control unit 2214 controls storing the test signal written to the magnetic disk 12 in the signal storing unit 2233. The bit error rate calculating unit 2215 calculates a bit error rate of the test signal stored in the signal storing unit 2233. Further, the bit error rate calculating unit 2215 stores the calculated bit error rate in the piezo voltage and bit error rate storing unit 2232 in association with the candidate voltage value used to write the corresponding test signal. The comparing and calculating unit 2216 compares the bit error rates stored in the piezo voltage and bit error rate storing unit 2232 with each other. Then, the comparing and calculating unit 2216 specifies one of the candidate voltage values associated with the lowest bit error rate as a piezo voltage value, and stores the specified piezo voltage value in the piezo voltage storing unit 2231.

Figure 7:
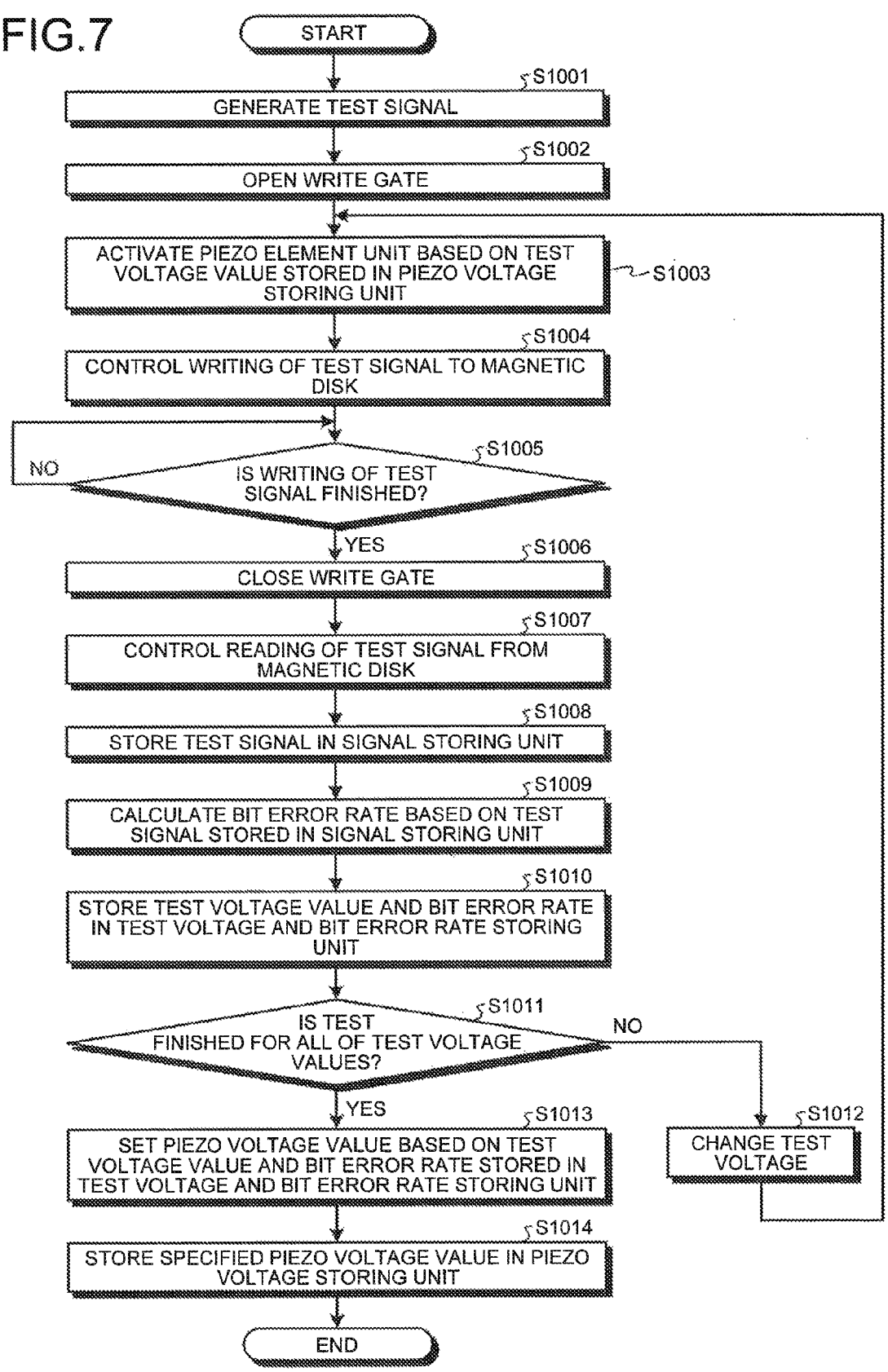
FIG. 7 is a flowchart illustrating a piezo voltage setup process according to the first embodiment.

Next, the piezo voltage setting process is explained with reference to FIG. 7. FIG. 7 is a flowchart of the piezo voltage setting process. First, the test signal generating unit 2211 generates the test signal (S1001). Then, the write gate control unit 2212 controls the R/W channel 224 to open the write gate (S1002).

Next, the piezo voltage control unit 2213 refers to the piezo voltage storing unit 2231, and acquires one of the stored candidate voltage values as a test voltage value. Then, the piezo voltage control unit 2213 controls the activation of the piezo element unit 156 based on the acquired voltage value (S1003).

Next, the R/W control unit 2214 controls the writing of the test signal to the magnetic disk 12 (S1004). In particular, the R/W control unit 2214 controls to cause the current to flow through the coil 154b of the magnetic head 15 in accordance with the test signal generated by the test signal generating unit 2211. Then, the R/W control unit 2214 determines whether the writing of the test signal to the magnetic disk 12 is completed (S1005). When it is determined that the writing of the test signal has not been completed (No at S1005), the R/W control unit 2214 repeats the process of S1005 until the writing of the test signal is completed. On the other hand, when it is determined that the writing of the test signal has been completed (Yes at S1005), the write gate control unit 2212 closes the write gate (S1006).

Next, the R/W control unit 2214 performs control to read the test signal written to the magnetic disk 12 (S1007). Then, the R/W control unit 2214 stores the read test signal to the signal storing unit 2233 (S1008). Subsequently, the bit error rate calculating unit 2215 acquires the test signal from the signal storing unit 2233, and calculates the bit error rate based on the acquired test signal (S1009). Further, the bit error rate calculating unit 2215 stores the test voltage value used for writing the test signal for which the bit error rate is calculated at S1009 in the test voltage and bit error rate storing unit 2232 in association with the bit error rate calculated at S1009 (S1010).

Next, the comparing and calculating unit 2216 determines whether the test signal is written by using all of the candidate voltage values stored in the piezo voltage storing unit 2231 (S1011). If it is determined that the test signal has not been written by using all of the candidate voltage values (No at S1011), the piezo voltage control unit 2213 sets one of the candidate voltage values stored in the piezo voltage storing unit 2231 and that has not yet been tested, as the test voltage value (i.e., change the test voltage) (S1012), and repeats the process from S1003.

On the other hand, if it is determined that the test signal is written by using all of the candidate voltage values stored in the piezo voltage storing unit 2231 (S1011), the comparing and calculating unit 2216 compares the bit error rates stored in the test voltage and bit error rate storing unit 2232 with each other. Then, the comparing and calculating unit 2216 specifies one of the candidate voltage values associated with the lowest bit error rate as a piezo voltage value (S1013). Subsequently, the comparing and calculating unit 2216 stores the specified piezo voltage value in the piezo voltage storing unit 2231 (S1014). Consequently, the piezo voltage setting process is finished.

Figure 8:
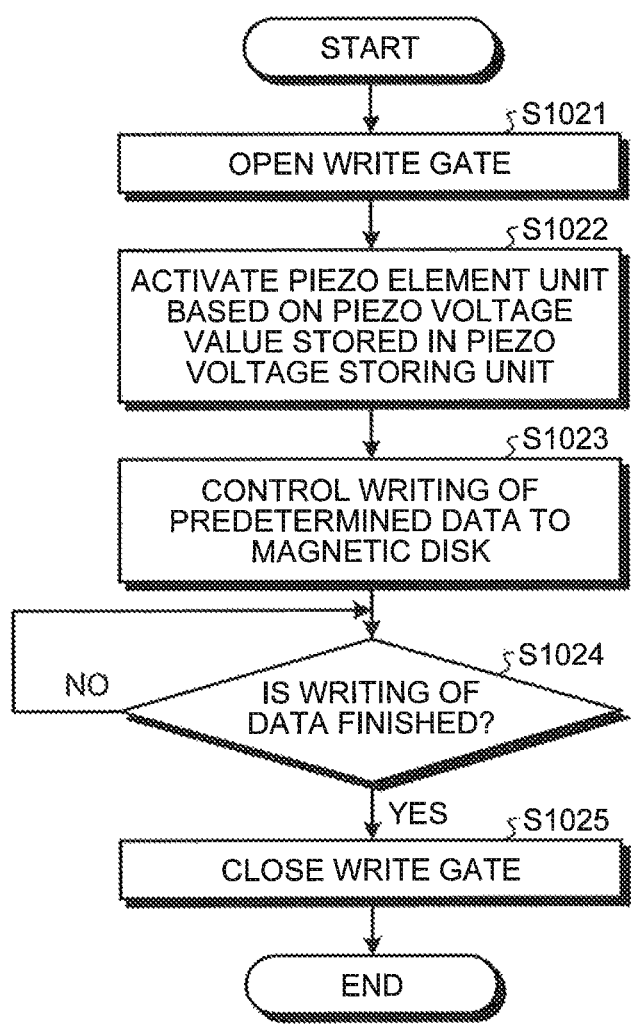
FIG. 8 is a flowchart illustrating a data write process according to the first embodiment.

Next, processing performed when data is written by using the piezo voltage value set by the piezo voltage setting process is explained with reference to FIG. 8. FIG. 8 is a flowchart of data write process performed by using the stored piezo voltage value. Here, the data write process is a process to write user data instructed to be written by a personal computer and/or the like to the magnetic disk.

First, the MPU 221 performs control to open the write gate (S1021). Next, the MPU 221 acquires the piezo voltage value that is stored in the piezo voltage storing unit 2231 as a result of the piezo voltage setting process. Then, the MPU 221 performs control to apply voltage corresponding to the acquired piezo voltage value on the piezo element unit 156 (S1022). Consequently, the distance between the magnetic pole 154c and the light emitting unit 155b is adjusted in the head travel direction.

Next, the MPU 221 controls writing of predetermined data with respect to the magnetic disk 12 (S1023). In particular, the MPU 221 performs control to write data received from the host computer by the HDC 225 to the magnetic disk 12. Then, the MPU 221 determines whether the writing of the data is completed (S1024). If it is determined that the writing of the data is not completed (No at S1024), the process at S1024 is repeated until the writing of the data is completed.

On the other hand, if it is determined that the writing of the data is completed (Yes at S1024), the MPU 221 performs controls to close the write gate (S1025), and finishes the process.

As described above, according to the magnetic disk device 1 of the first embodiment, the magnetic head 15 is provided with the piezo element unit 156 which can adjust the distance between the magnetic pole 154c and the light emitting unit 155b. Consequently, it becomes capable of applying the magnetic field at the position where the gradient of the temperature distribution of the surface temperature of the magnetic disk 12 is steep. Thus, an effect in which the quality of writing with respect to the magnetic disk such as the signal-to-noise ratio and/or the bit error rate is improved can be obtained.

Second Embodiment

Figure 9:
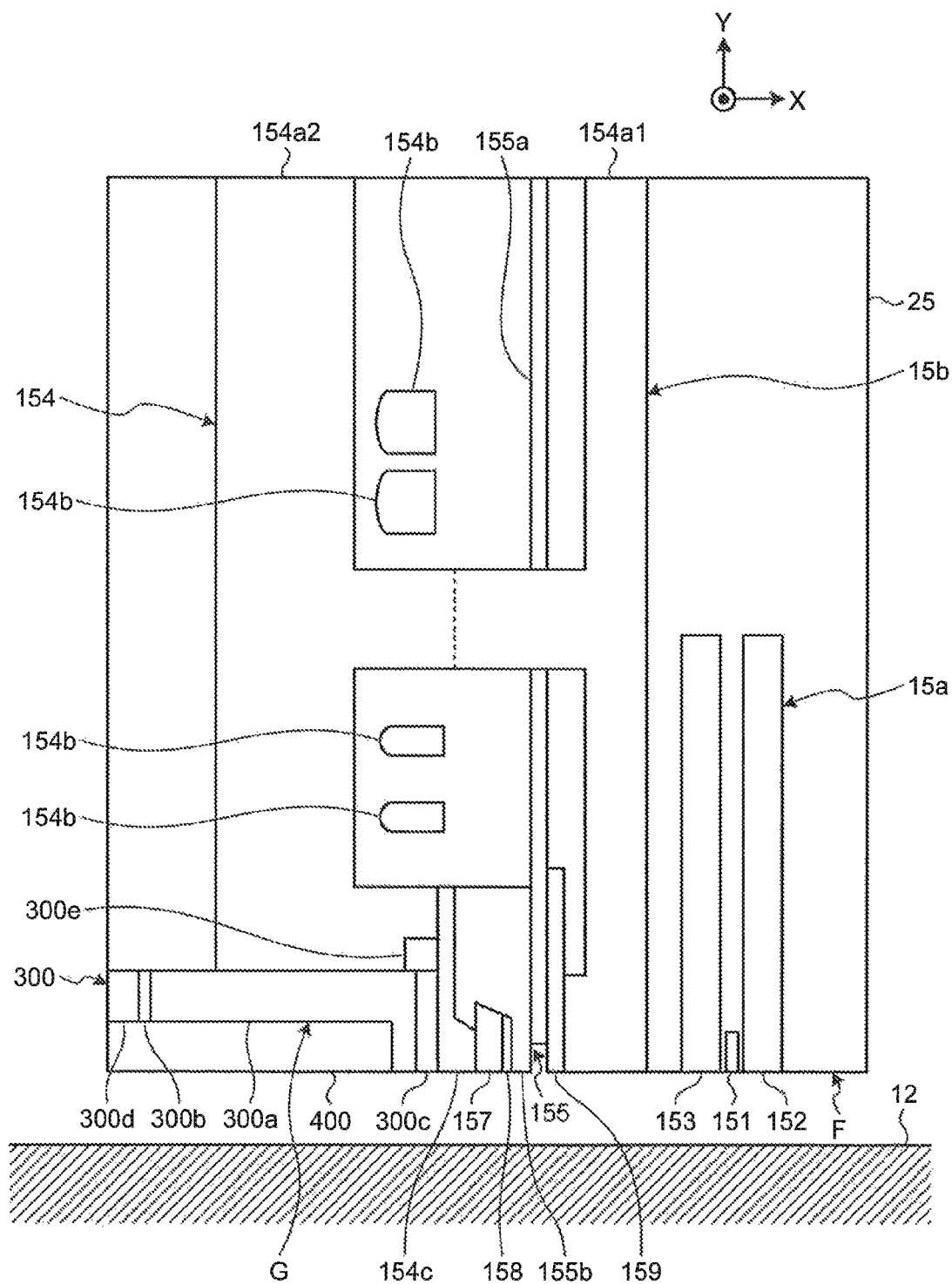
FIG. 9 is a cross sectional view illustrating a magnetic head according to a second embodiment.

Next, a second embodiment is described with reference to FIG. 9. FIG. 9 is a cross sectional diagram of a magnetic head 25 of the second embodiment. The magnetic head 25 of the present embodiment differs from the magnetic head 15 of the first embodiment in that, according to the magnetic head 25, at least a portion of a piezo element unit 300 is arranged at a position separated from the floating surface F in the +Y direction. Thus, in the following, parts the same as that in the first embodiment are referred to by the same reference numerals, and the explanations thereof are omitted.

As illustrated in FIG. 9, the magnetic head 25 comprises, at a side opposing the magnetic disk 12: a substantially flat floating surface F; and a substantially flat surface G positioned away from the floating surface F in the +Y direction. That is to say, the magnetic head 25 includes a recessed portion at a rear end in the head travel direction as seen in the cross section of FIG. 9. Then, at least a portion of the piezo element unit 300 is arranged on the surface G. The recessed portion is filled by a protective coating 400 such as the ABS. The floating surface side of the protective coating is formed in substantially flat together with the floating surface side of the magnetic pole 154c and the light emitting unit 155b.

As described above, according to the magnetic disk device of the second embodiment, the magnetic head 25 is provided with the piezo element unit 300 which can adjust the distance between the magnetic pole 154c and the light emitting unit 155b. Consequently, it becomes capable of applying the magnetic field at the position where the gradient of the temperature distribution of the surface temperature of the magnetic disk 12 is steep. Thus, an effect in which the quality of writing with respect to the magnetic disk such as the signal-to-noise ratio and/or the bit error rate is improved can be obtained.

Further, according to the second embodiment, the portion of the piezo element unit 300 is arranged at a position separated from the floating surface F in the direction separating from the magnetic disk 12, and the protective coating 400 is provided on the floating surface side thereof. Thus, the portion of the piezo element unit 300 is protected by the protective coating 400. Consequently, an effect in which the piezo electrodes and/or the like which corrodes comparatively easily can be protected can be obtained.

In the first and the second embodiments, the piezo voltage setting process is performed at the time of testing the magnetic disk, before the shipment thereof and after assembling the magnetic disk. However, the present embodiment is not limited thereto, and the piezo voltage setting process may be performed after the shipment of the magnetic disk device. Consequently, even if, for example, the piezo voltage of the magnetic disk device set at the time of shipment is no longer able to set the distance between the magnetic pole and the near-field light generating unit appropriately due to the degradation over time of the piezo element, it becomes capable of resetting an appropriate piezo voltage.

Further, in the first and the second embodiments, the distance between the magnetic pole and the near-field light generating unit is adjusted by using the piezo element. However, the present embodiment is not limited thereto, and any configuration such as any piezoelectric element and/or a current driven element can be employed as long as it can adjust the distance between the magnetic pole and the near-field light generating unit.

Further, in the first and the second embodiments, the distance between the magnetic pole and the near-field light generating unit is shortened by applying voltage to the piezo element. However, the present embodiment is not limited thereto, and any configuration such as a configuration that elongates the distance between the magnetic pole and the near field generating unit can be used, as long as such a configuration can adjust the distance between the magnetic pole and the near-field light generating unit to improve the quality of writing.

Further, in the first and the second embodiments, each of the test signal generating unit, the write gate control unit, the piezo voltage control unit, the R/W control unit, the bit error rate calculating unit, and the comparing and the calculating unit (hereinafter, referred to as the test signal generating unit and the like) is provided by executing the program stored in the ROM by the MPU. However, the present embodiment is not limited thereto, and at least one of the test signal generating unit and the like can be configured by a separate IC which differs from the MPU.

Further, in the first and the second embodiments, the bit error rate is calculated based on the test signal and the piezo voltage is set based on the calculated bit error rate. However, the present embodiment is not limited thereto, and any value such as for example the HSC can be calculated as long as such a value can verify the quality of writing of the test signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head that is arranged opposite a magnetic recording medium comprising a recording layer, the magnetic head comprising:
    a magnetic pole comprising a soft magnetic material;
    a light emitting unit arranged with respect to the magnetic pole in a travel direction of the magnetic head, and emits light with respect to the recording layer;
    a distance adjusting unit that adjusts a distance between the magnetic pole and the light emitting unit; and
    a magnetic pole position control unit having a negative thermal expansion coefficient, and arranged between the magnetic pole and the light emitting unit.

2. The magnetic head of claim 1, wherein
    the light emitting unit is arranged in front of the magnetic pole in the travel direction of the magnetic head, and
    the distance adjusting unit is arranged behind the magnetic pole in the travel direction of the magnetic head.

3. A magnetic head that is arranged opposite a magnetic recording medium comprising a recording layer, the magnetic head comprising:
    a magnetic pole comprising a soft magnetic material;
    a light emitting unit arranged with respect to the magnetic pole in a travel direction of the magnetic head, and emits light with respect to the recording layer;
    a distance adjusting unit that adjusts a distance between the magnetic pole and the light emitting unit; and
    a rigid member arranged in front of the light emitting unit in the travel direction of the magnetic head and configured by a low thermal expansion material.

4. The magnetic head of claim 1, wherein the distance adjusting unit is a piezoelectric element.

5. The magnetic head of claim 1, wherein the light emitting unit generates near-field light based on laser light guided from an outside of the magnetic head.

6. A magnetic head that is arranged opposite a magnetic recording medium comprising a recording layer, the magnetic head comprising:
    a magnetic pole comprising a soft magnetic material;
    a light emitting unit arranged with respect to the magnetic pole in a travel direction of the magnetic head, and emits light with respect to the recording layer;
    a distance adjusting unit that adjusts a distance between the magnetic pole and the light emitting unit;
    a substantially flat first face and a substantially flat second face on a side opposing the magnetic recording medium, the second face being located at a position separated from the first face in a direction separating from the magnetic recording medium, wherein
    each of the magnetic pole, the light emitting unit, and a portion of the distance adjusting unit is arranged on the first face, and
    other portion of the distance adjusting unit is arranged on the second face.

7. The magnetic head of claim 6, further comprising a protective coating covering the second face on a side of the magnetic head opposing the magnetic recording medium, wherein
    a face of the protective coating opposing the magnetic recording medium forms a substantially flat face with the first face.

8. A magnetic disk device comprising:
    a magnetic recording medium; and
    a magnetic head, wherein
    the magnetic head is arranged opposite the magnetic recording medium comprising a recording layer, the magnetic head comprising:
    a magnetic pole comprising a soft magnetic material;
    a light emitting unit arranged with respect to the magnetic pole in a travel direction of the magnetic head, and emits light with respect to the recording layer;
    a distance adjusting unit that adjusts a distance between the magnetic pole and the light emitting unit; and
    a magnetic pole position control unit having a negative thermal expansion coefficient, and arranged between the magnetic pole and the light emitting unit.

9. The magnetic disk device of claim 8, further comprising:
    a storage unit; and
    a controller, wherein
    the storage unit stores therein information about a reproduction signal, and
    the controller controls the distance adjusting unit based on the information stored in the storage unit to adjust the distance between the magnetic pole and the light emitting unit in the travel direction of the magnetic head.

10. The magnetic disk device of claim 8, wherein
    the light emitting unit is arranged in front of the magnetic pole in the travel direction of the magnetic head, and
    the distance adjusting unit is arranged behind the magnetic pole in the travel direction of the magnetic head.

11. A magnetic disk device comprising:
    a magnetic recording medium; and
    a magnetic head, wherein
    the magnetic head is arranged opposite the magnetic recording medium comprising a recording layer, the magnetic head comprising:
    a magnetic pole comprising a soft magnetic material;
    a light emitting unit arranged with respect to the magnetic pole in a travel direction of the magnetic head, and emits light with respect to the recording layer;
    a distance adjusting unit that adjusts a distance between the magnetic pole and the light emitting unit; and
    a rigid member arranged in front of the light emitting unit in the travel direction of the magnetic head and configured by a low thermal expansion material.

12. The magnetic disk device of claim 8, wherein the distance adjusting unit is a piezoelectric element.

13. The magnetic disk device of claim 8, wherein the light emitting unit generates near-field light based on laser light guided from an outside of the magnetic head.

14. A magnetic disk device comprising:
    a magnetic recording medium; and
    a magnetic head, wherein the magnetic head is arranged opposite the magnetic recording medium comprising a recording layer, the magnetic head comprising:

a magnetic pole comprising a soft magnetic material;

a light emitting unit arranged with respect to the magnetic pole in a travel direction of the magnetic head, and emits light with respect to the recording layer;

a distance adjusting unit that adjusts a distance between the magnetic pole and the light emitting unit; and a substantially flat first face and a substantially flat second face on a side opposing the magnetic recording medium, the second face being located at a position separated from the first face in a direction separating from the magnetic recording medium, wherein each of the magnetic pole, the light emitting unit, and a portion of the distance adjusting unit is arranged on the first face, and other portion of the distance adjusting unit is arranged on the second face.

15. The magnetic disk device of claim 14, further comprising a protective coating covering the second face on a side of the magnetic head opposing the magnetic recording medium, wherein a face of the protective coating opposing the magnetic recording medium forms a substantially flat face with the first face.

16. The magnetic head of claim 3, wherein the light emitting unit is arranged in front of the magnetic pole in the travel direction of the magnetic head, and the distance adjusting unit is arranged behind the magnetic pole in the travel direction of the magnetic head.

17. The magnetic head of claim 3, wherein the distance adjusting unit is a piezoelectric element.

18. The magnetic head of claim 3, wherein the light emitting unit generates near-field light based on laser light guided from an outside of the magnetic head.

* * * * *